(12) United States Patent
Matsushima

(10) Patent No.: US 8,810,753 B2
(45) Date of Patent: Aug. 19, 2014

(54) LIQUID CRYSTAL DEVICE AND ELECTRONIC APPARATUS

(75) Inventor: Toshiharu Matsushima, Tottori (JP)

(73) Assignee: Sony Corporation (JP)

( * ) Notice: Subject to any disclaimer, the term of this patent is extended or adjusted under 35 U.S.C. 154(b) by 59 days.

(21) Appl. No.: 13/302,758

(22) Filed: Nov. 22, 2011

(65) Prior Publication Data

US 2012/0140150 A1    Jun. 7, 2012

(30) Foreign Application Priority Data

Dec. 1, 2010  (JP) .................................. 2010-268043

(51) Int. Cl.
*G02F 1/1335* (2006.01)

(52) U.S. Cl.
USPC .............................. 349/98; 349/112; 349/113

(58) Field of Classification Search
None
See application file for complete search history.

(56) References Cited

U.S. PATENT DOCUMENTS

| 6,933,994 B1* | 8/2005 | Kaneko et al. ................ 349/112 |
| 2001/0048495 A1* | 12/2001 | Yamaguchi et al. .......... 349/113 |
| 2008/0055523 A1* | 3/2008 | Nishihara et al. .............. 349/96 |

FOREIGN PATENT DOCUMENTS

| JP | 2771392 | 7/1998 |
| JP | 11-242217 | 8/1999 |
| JP | 11-237623 | 9/1999 |

* cited by examiner

*Primary Examiner* — Wen-Ying P Chen
(74) *Attorney, Agent, or Firm* — Sheridan Ross P.C.

(57) ABSTRACT

A liquid crystal device includes: a liquid crystal layer; a first substrate and a second substrate between which the liquid crystal layer is sandwiched; a reflective layer operable to reflect light which is incident thereon from the second substrate side through the liquid crystal layer; a plurality of optical layers disposed on the side opposite to the first substrate with reference to the second substrate; and a plurality of light-scattering layers which are each disposed in at least one of a region between the second substrate and the optical layers and a region between two mutually proximate ones of the optical layers and which each show relatively larger forward scattering and relatively smaller back scattering.

16 Claims, 7 Drawing Sheets

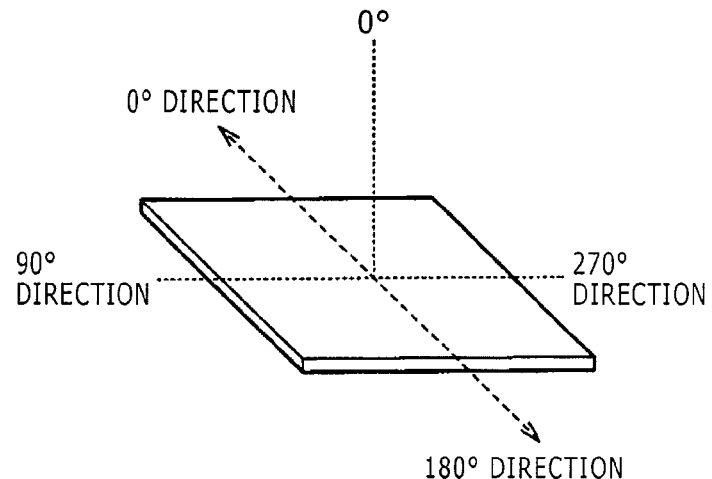
FIG. 5A
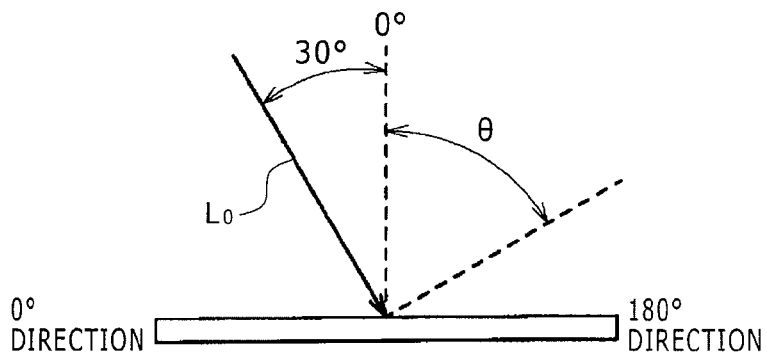
FIG. 5B
FIG. 6
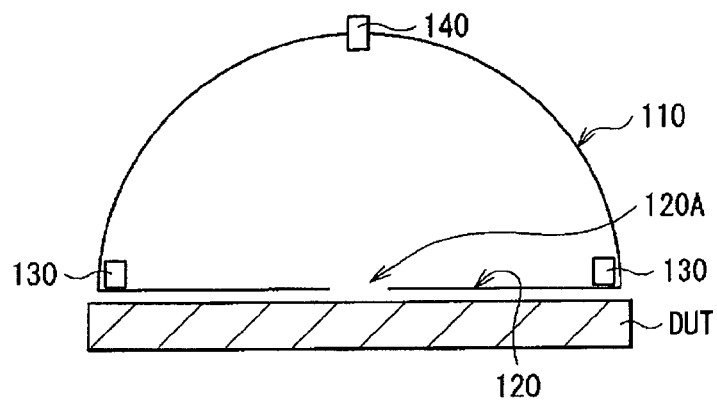

US 8,810,753 B2

LIQUID CRYSTAL DEVICE AND ELECTRONIC APPARATUS

CROSS REFERENCES TO RELATED APPLICATIONS

The present application claims priority to Japanese Patent Application No. 2010-268043 filed on Dec. 1, 2010, the disclosure of which is incorporated herein by reference.

BACKGROUND

The present disclosure relates to a liquid crystal device of the reflective type or of the transflective type in which a reflective section and a transmissive section are both provided, and to an electronic apparatus having the liquid crystal device as a display unit.

In recent years, there has been an increasing demand for display devices to be applied to mobile apparatuses such as cell phones and electronic papers. Attendant on the demand, attention has been paid to reflective type display devices. A reflective type display device displays images by reflecting externally incident light (ambient light) by a reflector plate, and does not need a backlight. Therefore, the reflective type display device promises savings of electric power by an amount corresponding to the backlight, and permits a mobile apparatus to be driven for a longer time as compared with the case where a transmissive type display device is used. In addition, since the backlight is not needed, the reflective type display device can be made lighter in weight and smaller in size accordingly.

Since display in a reflective type display device is performed utilizing external light, a layer having a scattering function has to be provided in the display device. For instance, in Japanese Patent No. 2771392, a reflector plate is provided with a rugged surface, whereby a scattering function is imparted to the reflector plate. Besides, in Japanese Patent Laid-open No. Hei 11-237623, it is disclosed to newly provide a layer having mainly a property for forward scattering (such a layer will hereinafter be referred to as "light-scattering layer"). Furthermore, in Japanese Patent Laid-open No. Hei 11-242217, it is disclosed that a reflector plate is provided with a rugged surface and a light-scattering layer is newly provided.

SUMMARY

Meanwhile, in a reflective type display device, it may be contemplated, for example, to increase the forward scattering for the purpose of obtaining an increased luminance in the frontward direction. In this instance, if there is a light-scattering layer provided as above-mentioned, it may be designed to increase the forward scattering ability of the light-scattering layer. Upon such a designing, however, the back scattering ability of the light-scattering layer would also be increased, leading to a lowering in contrast.

Thus, there is a need for a reflective type display device by which luminance in the frontward direction can be increased while suppressing a lowering in contrast, and for an electronic apparatus having the display device.

According to an embodiment of the present disclosure, there is provided a liquid crystal device including: a liquid crystal layer; a first substrate and a second substrate between which the liquid crystal layer is sandwiched; a reflective layer operable to reflect light which is incident thereon from the second substrate side through the liquid crystal layer; and a plurality of optical layers disposed on the side opposite to the first substrate with reference to the second substrate. The liquid crystal device further includes a plurality of light-scattering layers which are each provided in at least one of a region between the second substrate and the optical layers and a region between two mutually proximate ones of the optical layers. Here, each of the light-scattering layers shows relatively larger forward scattering and relatively smaller back scattering.

According to another embodiment of the present disclosure, there is provided an electronic apparatus having the above-mentioned liquid crystal device.

In the liquid crystal device and the electronic apparatus according to embodiments of the present disclosure, the plurality of light-scattering layers showing relatively larger forward scattering and relatively smaller back scattering are each provided in at least one of the region between the second substrate and the optical layers and the region between two mutually proximate ones of the optical layers. As a result, for example, comparing the case where the number of the light-scattering layers and the forward scattering properties of the individual light-scattering layers are regulated so as to increase the forward scattering of the liquid crystal device as a whole in the present disclosure and the case where the forward scattering of a single light-scattering layer is increased, in a liquid crystal device having only the single light-scattering layer, so as to bring the forward scattering of the liquid crystal device as a whole to the same level as achieved in the present disclosure, back scattering can be made smaller in the former case than in the latter case.

Meanwhile, the plurality of light-scattering layers each have, for example, a filler-containing tacky layer or a filler-containing resin layer. Preferably, at least one of the plurality of light-scattering layers has the tacky layer. The plurality of light-scattering layers are preferably disposed separate from each other.

In the liquid crystal device and the electronic apparatus according to embodiments of the present disclosure, the uppermost one of the plurality of optical layers may have a polarizing layer, and all the other ones than the uppermost one of the plurality of optical layers may each have a phase difference layer. In this case, the polarizing layer which is the uppermost one of the plurality of optical layers has a function of converting natural light (non-polarized light) being externally incident thereon into linearly polarized light. Further, one or a plurality of phase difference layers which are all the other ones than the uppermost one of the plurality of optical layers have, as a whole of the one or plurality of phase difference layers, a function of converting the linearly polarized light being incident thereon from the polarizing layer side into circularly polarized light.

According to the liquid crystal device and the electronic apparatus according to embodiments of the present disclosure, back scattering can be made smaller, as compared with the case where the forward scattering of a single light-scattering layer is increased in a liquid crystal device having only the single light-scattering layer; therefore, luminance in the frontward direction can be increased while suppressing a lowering in contrast.

In addition, in the case where at least one of the plurality of light-scattering layer in the present disclosure has the filler-containing tacky layer, a tacky layer or layers used hitherto for adhesion between optical layers or for adhesion between an optical layer and the second substrate can be used as the light-scattering layer. In that case, therefore, the use of the tacky layer as the light-scattering layer makes it possible to reduce the number of layers to be newly added. Consequently, the thickness of the liquid crystal device can be suppressed. In addition, in the case where all the light-scattering layers have filler-containing tacky layers and when tacky layers used hitherto for adhesion between optical layers or for adhesion between an optical layer and the second substrate are used as the light-scattering layers, it is unnecessary to add new such layers. As a result, the thickness of the liquid crystal device can be the same as that in the past, and there is no need for a new optical design.

Additional features and advantages are described herein, and will be apparent from the following Detailed Description and the figures.

BRIEF DESCRIPTION OF THE FIGURES

FIG. 5A is a conceptual diagram for illustrating coordinates for the orientation characteristics of FIG. 4, and FIG. 5B is a conceptual diagram for illustrating the incidence angle of light incident on the liquid crystal device at the time of measuring the orientation characteristics of FIG. 4.

FIG. 6 is a schematic view for illustrating an example of an apparatus for measurement of contrast.

DETAILED DESCRIPTION

Figure 11:
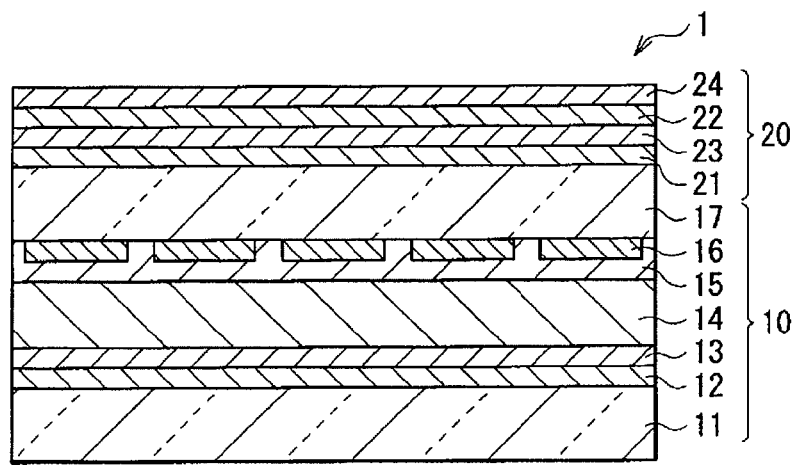
FIG. 11 is a sectional view showing another modification of the configuration of the liquid crystal device of FIG. 1.
Figure 12:
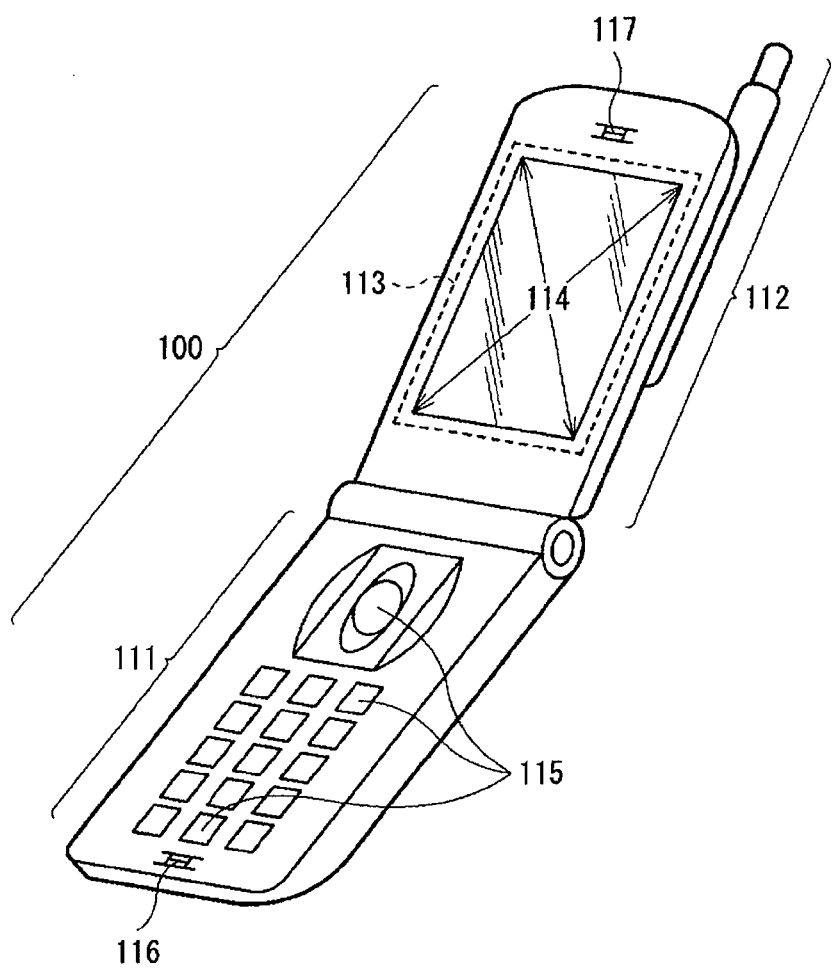
FIG. 12 is a perspective view of an example of the configuration of an electronic apparatus according to an application example.

Embodiments of the present application will be described below in detail with reference to the drawings. Incidentally, description will be made in the following order.
1. Embodiment
An example in which two light-scattering layers are disposed separately (FIGS. 1 to 6)
2. Modifications
Variations of positions of light-scattering layers (FIGS. 7 to 10)
An example in which two light-scattering layers are disposed in contact (FIG. 11)
3. Application Example
An example in which a liquid crystal device according to the embodiment and modifications is applied to electronic apparatus (FIG. 12)

1. Embodiment

Figure 1:
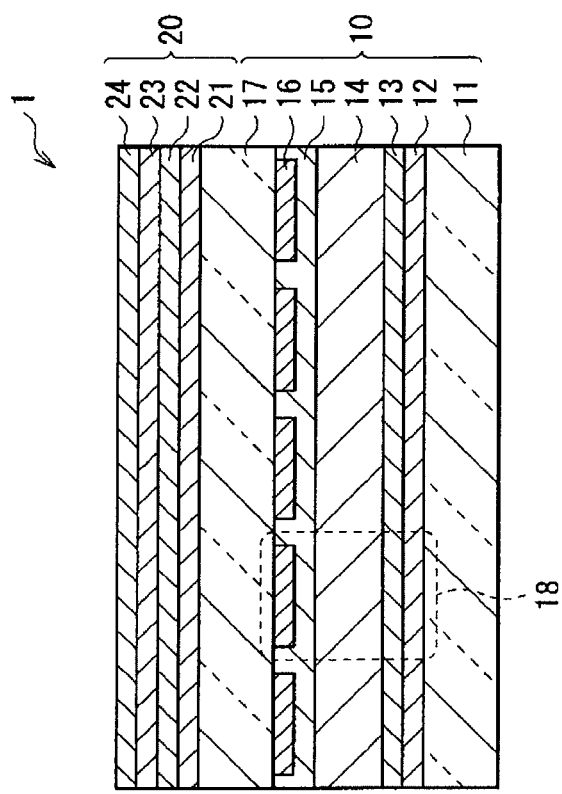
FIG. 1 is a sectional view showing an example of the configuration of a liquid crystal device according to an embodiment of the present disclosure.
Figure 2:
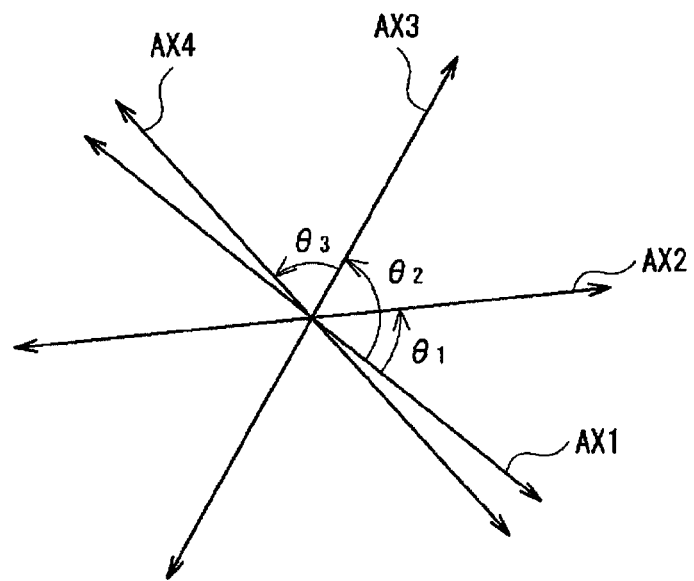
FIG. 2 is a conceptual diagram showing an example of relationships among a transmission axis, a phase delay axis and rubbing axes in the liquid crystal device of FIG. 1.

FIG. 1 is a sectional view showing an example of the general configuration of a liquid crystal device 1 according to an embodiment of the present disclosure. FIG. 2 is a conceptual diagram showing an example of the relations among transmission axes or phase delay axes of layers included in the liquid crystal device of FIG. 1. Incidentally, FIG. 1 is merely a schematic illustration, and may be different from actual sizes or shapes. The liquid crystal device 1, for example, as shown in FIG. 1, includes a liquid crystal panel 10, an optical layer stack 20 disposed over the liquid crystal panel 10, and a driving circuit (not shown) for driving the liquid crystal panel 10.

The liquid crystal panel 10 is a liquid crystal panel of the reflective type or the transflective type in which a reflection section and a transmissive section are both provided. The liquid crystal panel 10 has a configuration in which, for example, as shown in FIG. 1, a lower substrate 11, a plurality of reflective electrodes 12, an alignment film 13, a liquid crystal layer 14, an alignment film 15, a plurality of transparent electrodes 16 and an upper substrate 17 are stacked in this order from the side opposite to the side of the optical layer stack 20. Incidentally, the lower substrate 11 corresponds to a specific example of the "first substrate" in the present disclosure, and the upper substrate 17 corresponds to a specific example of the "second substrate" in the present disclosure. In addition, the reflective electrodes 12 correspond to a specific example of the "reflective layer" in the present disclosure.

On the other hand, the optical layer stack 20 has a configuration in which, for example, as shown in FIG. 1, a light-scattering layer 21, a phase difference layer 22, a light-scattering layer 23 and a polarizing layer 24 are stacked in this order from the side of the liquid crystal panel 10. Incidentally, in the liquid crystal panel 10 or the optical layer stack 20, some layers not shown in FIG. 1 may further be added. The phase difference layer 22 and the polarizing layer 24 correspond to specific examples of the "optical layers" in the present disclosure.

Of the lower substrate 11 and the upper substrate 17, at least the upper substrate 17 has a substrate which is transparent to visible light, for example, a plate glass or a light-transmitting resin substrate. The lower substrate 11 may be a substrate which is opaque to visible light, for example, a silicon wafer or the like.

The plurality of reflective electrodes 12 reflect light which is incident from the upper substrate 17 side through the liquid crystal layer 14. The plurality of reflective electrodes 12 are formed from a visible light-reflecting conductive material, for example, a metallic material such as Al—Nd. The plurality of reflective electrodes 12 are, for example, regularly disposed on that surface of the lower substrate 11 which is on the upper substrate 17 side, and are, for example, in band-like shape extending in a direction in the plane of the surface. Incidentally, in FIG. 1, a case where each of the reflective electrodes 12 extends in the left-right direction in the surface of drawing is shown as an example.

The plurality of transparent electrodes 16 are formed from a conductive material which is transparent to visible light, for example, ITO (Indium Tin Oxide). The plurality of transparent electrodes 16 are, for example, regularly disposed on that surface of the upper substrate 17 which is on the lower substrate 11 side, and are, for example, in band-like shape extending in a direction intersecting (for example, orthogonally intersecting) the extending direction of the reflective electrodes 12. Of the liquid crystal panel 10, those parts at which the reflective electrodes 12 intersect the transparent electrodes 16 are each a pixel 18, namely, a minimum unit in which the liquid crystal layer 14 can be partially driven by a voltage impressed between the reflective electrode 12 and the transparent electrode 16.

The alignment films 13 and 15 are each for aligning liquid crystal molecules in a predetermined direction. The alignment films 13 and 15 are, for example, formed from a polymer material such as polyimide and are, for example, formed by subjecting a coating of a polyimide or the like to a rubbing treatment. The liquid crystal layer 14 has, for example, a nematic liquid crystal; as described later, the liquid crystal layer 14 has a modulating function by which reflected light beams from the reflective electrodes 12 are transmitted or blocked on the basis of each pixel 18, according to voltages impressed from the driving circuit. Incidentally, by varying the level of transmission of light through the liquid crystal, gradation on the basis of each pixel 18 is controlled.

The polarizing layer 24 has a function of absorbing a predetermined linearly polarized light component and transmitting the other polarized light components. Therefore, the polarizing layer 24 has a function of converting natural light (non-polarized light) being externally incident thereon into linearly polarized light. The polarizing layer 24 is, for example, formed by adsorbing a halogen substance such as iodine or a dichromatic dye onto a polymer film such as polyvinyl butyral film. The phase difference layer 22 is, for example, a uniaxially stretched film of polyvinyl alcohol resin. Its retardation is 0.14 μm, which is equivalent to ¼ of the wavelength of green light which is the highest in visual sensitivity of visible light. Accordingly, the phase difference layer 22 has a function of converting the linearly polarized light being incident thereon from the polarizing layer 24 side into circularly polarized light; thus, the phase difference layer 24 functions as a quarter-wave plate.

The light-scattering layer 21 is disposed in the region between the upper substrate 17 and the phase difference layer 22. On the other hand, the light-scattering layer 23 is disposed in a region between two mutually proximate optical layers (the phase difference layer 22 and the polarizing layer 24). In other words, the phase difference layer 22 is provided between the light-scattering layer 21 and the light-scattering layer 23, so that the light-scattering layer 21 and the light-scattering layer 23 are disposed separate from each other. The light-scattering layers 21, 23 each have such an optical characteristic as to show relatively larger forward scattering and relatively smaller back scattering. The light-scattering layers 21, 23 each have a filler-containing tacky layer or a filler-containing resin layer. Examples of the material constituting the tacky layer include paste. Preferably, at least one of the light-scattering layers 21, 23 has the filler-containing tacky layer. More preferably, both of the light-scattering layers 21, 23 have the filler-containing tacky layer.

Figure 3:
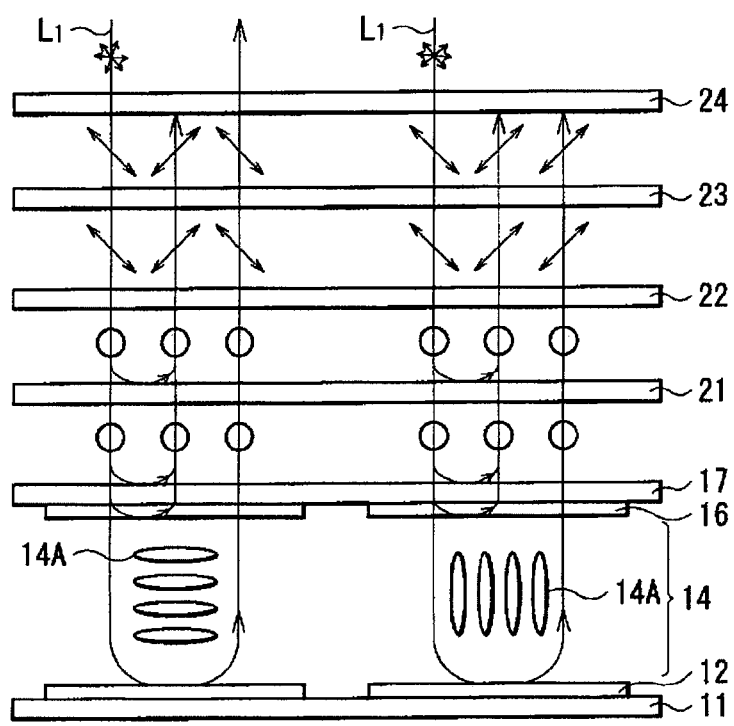
FIG. 3 is a conceptual diagram for illustrating operation of the liquid crystal device of FIG. 1.

Now, a transmission axis, a phase delay axis and rubbing axes in the liquid crystal device 1 will be described below. FIG. 2 illustrates conceptually a transmission axis, a phase delay axis and rubbing axes in the liquid crystal device 1. Incidentally, the retardation of the liquid crystal layer 14 is assumed to be 0.25 μm. The angle θ1 between the polarization axis (transmission axis AX1) of the polarizing layer 24 and the phase delay angle AX2 of the phase difference layer 22 is 45°. The angle θ2 between the transmission axis AX1 of the polarizing layer 24 and the rubbing axis AX3 of the alignment film 15 is 101°. The angle θ3 between the rubbing axis AX3 of the alignment film 15 and the rubbing axis AX4 of the alignment film 13 (namely, the twist angle of the liquid crystal) is 70°.

Where the transmission axis, the phase delay axis and the rubbing axes in the liquid crystal device 1 are set as above-mentioned, for example, as shown in FIG. 3, the natural light (non-polarized light) $L_1$ being externally incident is converted by the polarizing layer 24 into linearly polarized light, which is further converted by the phase difference layer 22 into left-handed circularly polarized light, to reach the light-scattering layer 21. The light back-scattered by the light-scattering layer 21 is converted into right-handed circularly polarized light, which is returned by the phase difference layer 22 into the linearly polarized light. This linearly polarized light is vibrating in a direction orthogonal to the transmission axis of the polarizing layer 24, and is therefore absorbed by the polarizing layer 24. In addition, the light reflected back at the interface between the upper substrate 17 and the transparent electrode 16 is also absorbed by the polarizing layer 24 in a similar manner. These light beams reflected back are all non-contributive to display, so that a high contrast can be obtained.

On the other hand, of the light forward-scattered by the light-scattering layer 21, the light beam incident on that region of the liquid crystal layer 14 on which no voltage is impressed (for example, a region where liquid crystal molecules 14A are aligned vertically to the lower substrate 11) is converted by the liquid crystal layer 14 into linearly polarized light beam, to reach the reflective electrode 12. This is because the retardation and the twist angle of the liquid crystal layer 14 are preliminarily so set as to yield this result. The reflected light is returned into the original left-handed circularly polarized light, through quite the same path. Such conversion can be generally said with respect to any liquid crystal layer 14 wherein such a conversion as to yield linear polarized light is effected on reflective electrodes 12. The left-handed circularly polarized light is returned by the phase difference layer 22 into the original linearly polarized light, which passes through the polarizing layer 24. In this case, therefore, the pixel 18 is in the state of bright display.

In addition, of the light forward-scattered by the light-scattering layer 21, the light beam incident on that region of the liquid crystal layer 14 on which a voltage is impressed (for example, a region where the liquid crystal molecules 14A are aligned parallel to the lower substrate 11) reaches the reflective electrode 12 as it is in the state of the left-handed polarized light beam, since the liquid crystal molecules 14A there are arrayed along a direction substantially parallel to the incident light and do not have birefringence. The light beam reaching the reflective electrode 12 is reflected by the reflective electrode 12, to be right-handed circularly polarized light beam. This light beam is absorbed by the polarizing layer 24, through the same path as that of the above-mentioned light back-scattered by the light-scattering layer 21. In this case, therefore, the pixel 18 is in the state of dark display.

Thus, in the present embodiment, the light beam back-scattered by the light-scattering layer 21 and the light beams reflected by the interfaces are absorbed by the combination of the phase difference layer 22 and the polarizing layer 24, so that a high contrast can be obtained. Besides, since the pixel 18 gets in the state of dark display under the condition where a sufficient voltage is impressed on the liquid crystal layer 14, it is possible to obtain a high contrast that is extremely difficult to realize by a single polarizing plate type liquid crystal display mode according to the related art.

In addition, in the present embodiment, the plurality of light-scattering layers 21 and 23 showing relatively larger forward scattering and relatively smaller back scattering are each disposed between the region between the upper substrate 17 and the phase difference layer 22 and a region between two mutually proximate optical layers (the phase difference layer 22 and the polarizing layer 24). As a result, for example, comparing the case where the forward scattering properties of the individual light-scattering layers 21 and 23 are regulated so as to increase the forward scattering of the liquid crystal device 1 as a whole and the case where the forward scattering of a single light-scattering layer is increased, in a liquid crystal device having only the single light-scattering layer, so as to bring the forward scattering of the liquid crystal device as a whole to the same level as achieved in the present disclosure, back scattering can be made smaller in the former case than in the latter case. Consequently, it is possible to increase the luminance in the frontward direction while suppressing a lowering in contrast.

Figure 4A:
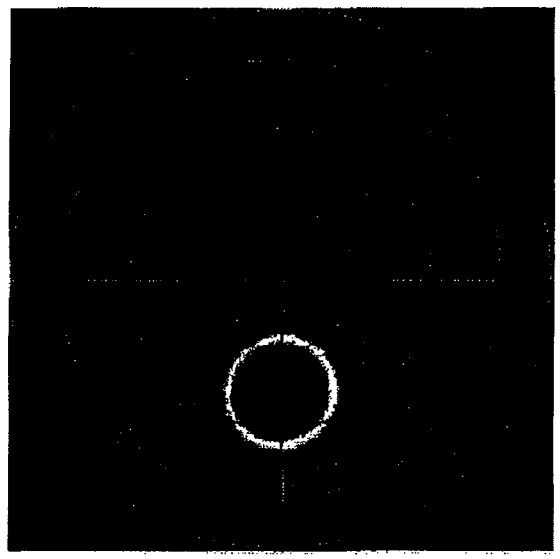
FIGS. 4A and 4B are characteristic diagrams showing examples of orientation characteristics of reflected light when light is incident on each of the liquid crystal device of FIG. 1 and a liquid crystal device according to a comparative example.
Figure 4B:
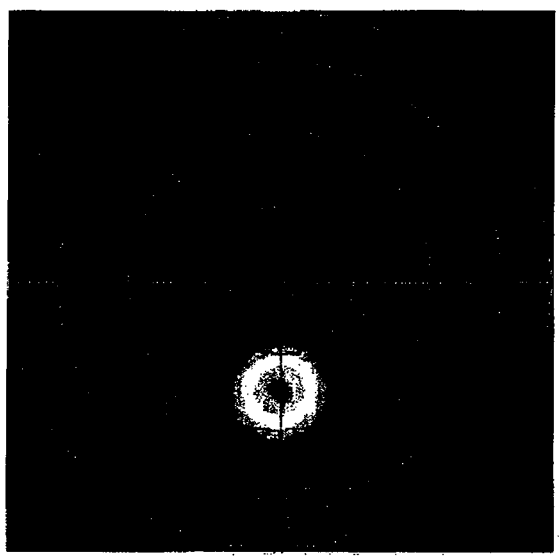

FIG. 4A shows an example of orientation characteristics of reflected light in the case where light is obliquely incident on a liquid crystal device in which only a single light-scattering layer is provided. FIG. 4B shows an example of orientation characteristics of reflected light in the case where light is obliquely incident on the liquid crystal device 1. Incidentally, according to the coordinates in FIGS. 4A and 4B, as shown in FIG. 5A, the upper side in FIGS. 4A and 4B corresponds to 0° direction, the left side in FIGS. 4A and 4B corresponds to 90° direction, the lower side in FIGS. 4A and 4B corresponds to 180° direction, and the right side in FIGS. 4A and 4B corresponds to 270° direction. Besides, as shown in FIG. 5B, light Lo is incident on the liquid crystal device along a direction which is inclined by 30° toward the 0° direction, from the normal to the liquid crystal device.

From FIGS. 4A and 4B, it is seen that in the case where the two light-scattering layers 21 and 23 are provided, the reflected light is spreading into a wider range and the dependency of panel luminance on the incidence angle of the light being externally incident is lowered, as compared with the case where only the single light-scattering layer is provided. Further, it is also seen from FIGS. 4A and 4B that in the case where the two light-scattering layers 21 and 23 are provided, the luminance in the frontward direction is enhanced, as compared with the case where only the single light-scattering layer is provided.

FIG. 6 illustrates an example of an apparatus for measurement of contrast in a liquid crystal device as a device under test DUT. The apparatus shown in FIG. 6 includes a hemispherical diffusing member 110 which is hollow inside, and a light-blocking member 120 having an aperture 120A at a part corresponding to the center point of the hemispherical diffusing member 110. The apparatus further has a plurality of light sources 130 in the inside region surrounded by the hemispherical diffusing member 110 and the light-blocking member 120, and has a light-receiving device 140 directly above the aperture 120A of the light-blocking member 120. The device under test DUT is disposed under the light-blocking member 120. In this apparatus, when the plurality of light sources 130 are turned ON, the light emitted from the light sources 130 is scattered on the inside surface of the hemispherical diffusing member 110, the scattered light is incident through the aperture 120A on the device under test DUT, and the reflected light produced by reflection of the incident light from the side of the device under test DUT is measured by the light-receiving device 140. As a result, the contrast of the device under test DUT is obtained.

The contrast of the liquid crystal device in which only a single light-scattering layer is provided and the contrast of the liquid crystal device 1 in which the two light-scattering layers 21 and 23 were provided were measured by use of the apparatus shown in FIG. 6. As a result, the contrast of the former was 1:13, while the contrast of the latter was 1:15. From this, it has been found out that, when a plurality of light-scattering layers are provided and an increase in back scattering is suppressed, it is possible to suppress a lowering in contrast which would occur attendant on an increase in forward scattering.

Meanwhile, in the present embodiment, where at least one of the two light-scattering layers 21 and 23 has the filler-containing tacky layer, a tacky layer or layers used hitherto for adhesion between optical layers or for adhesion between an optical layer and the upper substrate 17 can be used as the light-scattering layer. In that case, therefore, the use of the tacky layer as the light-scattering layer makes it possible to reduce the number of layers to be newly added. Consequently, the thickness of the liquid crystal device 1 can be suppressed. In addition, in the case where all the light-scattering layers 21 and 23 have filter-containing tacky layers and when tacky layers used hitherto for adhesion between optical layers or for adhesion between an optical layer and the second substrate are used as the light-scattering layers, it is unnecessary to add new such layers. As a result, the thickness of the liquid crystal device 1 can be the same as that in the past, and there is no need for a new optical design.

2. Modifications

First Modification

Figure 7:
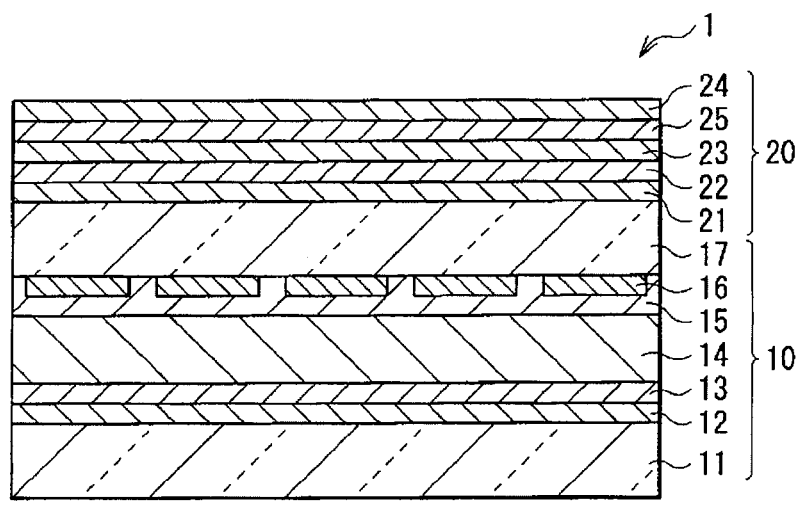
FIG. 7 is a sectional view showing a modification of the configuration of the liquid crystal device of FIG. 1.

While only one phase difference layer has been provided in the above-described embodiment, a plurality of phase difference layers may be provided. For example, as shown in FIG. 7, a phase difference layer 25 may further be provided between the light-scattering layer 23 and the polarizing layer 24. The phase difference layer 25 is, for example, a uniaxially stretched film of a polycarbonate resin. Its retardation is 0.27 μm, which is equivalent to about ½ of the wavelength of green light, the highest in visual sensitivity of visible light. Therefore, the phase difference layer 25 functions as a half-wave plate. The phase difference layers 22 and 25 have, as a whole of the phase difference layers 22 and 25, a function of converting the linearly polarized light being incident from the polarizing layer 24 side into circularly polarized light, and thus function as a (wide-band) circularly polarizing plate for a wide range of wavelengths. In the case where the phase difference layers 22 and 25 thus function as a circularly polarizing plate for a wide range of wavelengths, a color filter or filters (not shown) may be provided, for example, on the surface of the upper substrate 17 in the liquid crystal panel 10.

Here, the color filters are color filters for putting the light passing through the liquid crystal device 10 to color separation into, for example, three primary colors of red (R), green (G) and blue (B), or into, for example, four colors of R, G, B and white (W), the color filters being arranged correspondingly to the arrangement of the upper substrate 17. Examples of the filter arrangement (pixel arrangement) include stripe arrangement, diagonal arrangement, delta arrangement, and rectangle arrangement.

Figure 8:
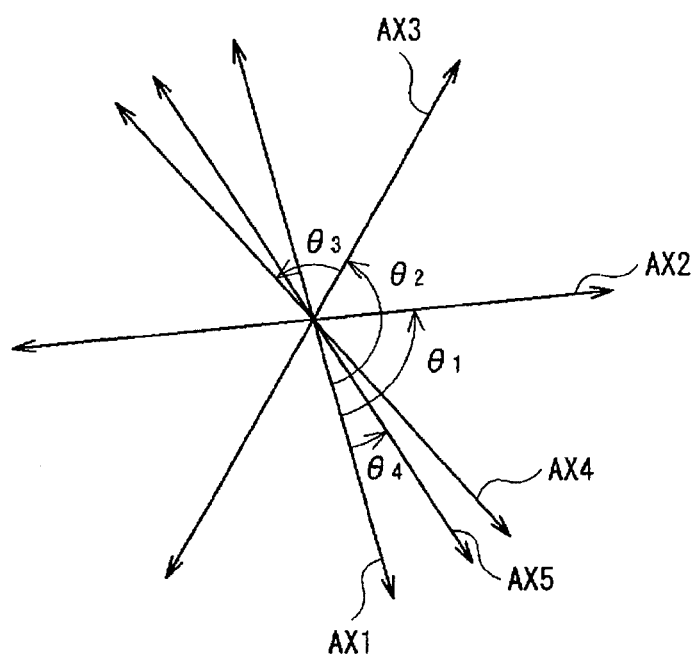
FIG. 8 is a conceptual diagram showing an example of relationships among a transmission axis, a phase delay axis and rubbing axes in the liquid crystal device of FIG. 7.

Now, a transmission axis, a phase delay axis and rubbing axes in the liquid crystal device 1 according to the present modification will be described below. FIG. 8 illustrates conceptually the transmission axis, the phase delay axis and the rubbing axes in the liquid crystal device 1 in the present modification. Incidentally, it is hereinafter assumed that the retardation of the liquid crystal layer 14 is 0.25 μm. The angle θ4 between the transmission axis AX1 of the polarizing layer 24 and the phase delay axis AX5 of the phase difference layer 25 is 17°. The angle θ1 between the transmission axis AX1 of the polarizing layer 24 and the phase delay angle AX2 of the phase difference layer 22 is 79°. The angle θ2 between the transmission axis AX1 of the polarizing layer 24 and the rubbing axis AX3 of the alignment film 15 is 135°. The angle θ3 between the rubbing axis AX3 of the alignment film 15 and the rubbing axis AX4 of the alignment film 13 (namely, the twist angle of the liquid crystal) is 70°. Since the angle θ4 between the transmission axis AX1 of the polarizing layer 24 and the phased delay axis AX5 of the phase difference layer 25 is 17°, the angle θ1 is 2×θ4+45=2×17+45=79°. Therefore, the stack of the phase difference layer 22 and the phase difference layer 25 functions as a circularly polarizing plate over a wide range of wavelengths.

In the present modification, like in the above-described embodiment, the light beam back-scattered by the light-scattering layer 21 and the light beams reflected back at the interfaces of the upper substrate 17 and the transparent electrode 16 are absorbed by the polarizing layer 24. These light beams are all non-contributive to display, so that a high contrast can be obtained.

On the other hand, of the light forward-scattered by the light-scattering layer 21, the light beam incident on that region of the liquid crystal layer 14 on which no voltage is impressed (for example, a region where liquid crystal molecules 14A are aligned vertically to the lower substrate 11) is converted by the liquid crystal layer 14 into linearly polarized light beam, to reach the reflective electrode 12. The light beam reflected by the reflective electrode 12 is returned into the original left-handed circularly polarized light beam. The left-handed circularly polarized light beam is returned by the phase difference layers 22 and 25 into the original linearly polarized light beam, which passes through the polarizing layer 24. In this case, therefore, the pixel 18 is in the state of bright display.

Besides, of the light forward-scattered by the light-scattering layer 21, the light beam incident on that region of the liquid crystal layer 14 on which a voltage is impressed (for example, a region where the liquid crystal molecules 14A are aligned parallel to the lower substrate 11) reaches the reflective electrode 12 as it is in the state of the left-handed polarized light beam, since the liquid crystal molecules 14A there are arrayed along a direction substantially parallel to the incident light and do not have birefringence. The light beam reflected by the reflective electrode 12 is to be the right-handed circularly polarized light beam. This light beam is absorbed by the polarizing layer 24, through the same path as that of the above-mentioned light back-scattered by the light-scattering layer 21. In this case, therefore, the pixel 18 is in the state of dark display.

Thus, in the present modification, the light beam back-scattered by the light-scattering layer 21 and the light beams reflected at the interfaces are absorbed by the combination of the phase difference layers 22, 25 and the polarizing layer 24, so that a high contrast can be obtained. Besides, since the pixel 18 gets in the state of dark display under the condition where a sufficient voltage is impressed on the liquid crystal layer 14, it is possible to obtain a high contrast that is extremely difficult to realized by a single polarizing plate type liquid crystal display mode according to the related art.

In addition, in the present modification, the plurality of light-scattering layers 21 and 23 showing relatively larger forward scattering and relatively smaller back scattering are each disposed between the region between the upper substrate 17 and the phase difference layer 22 and a region between two mutually proximate optical layers (the phase difference layer 22 and the polarizing layer 24). As a result, for example, comparing the case where the forward scattering properties of the individual light-scattering layers 21 and 23 are regulated so as to increase the forward scattering of the liquid crystal device 1 as a whole and the case where the forward scattering of a single light-scattering layer is increased, in a liquid crystal device having only the single light-scattering layer, so as to bring the forward scattering of the liquid crystal device as a whole to the same level as achieved in the present disclosure, back scattering can be made smaller in the former case than in the latter case. Consequently, it is possible to increase the luminance in the frontward direction while suppressing a lowering in contrast.

Second Modification

Figure 9:
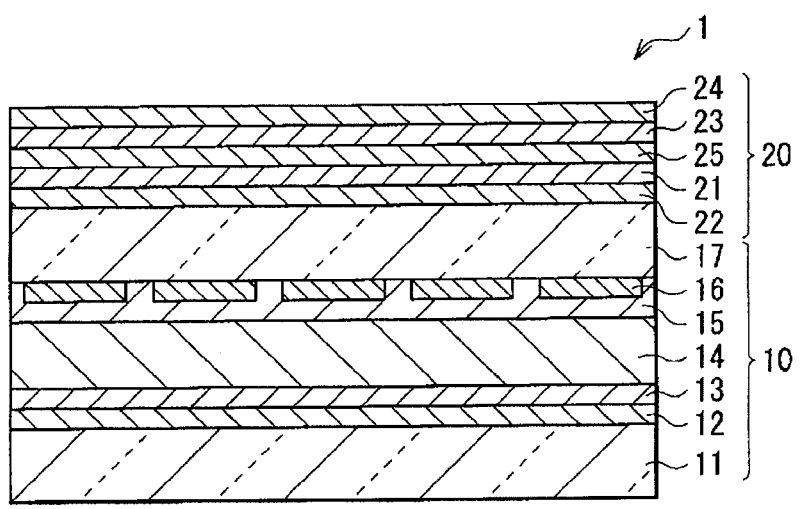
FIG. 9 is a sectional view showing a modification of the configuration of the liquid crystal device of FIG. 7.

While the two light-scattering layers 21 and 23 have been disposed respectively in the region between the upper substrate 17 and the phase difference layer 22 and a region between the two mutually proximate optical layers (the phase difference layer 22 and the phase difference layer 25) in the above-described modification, the light-scattering layers may be disposed in other regions. For example, as shown in FIG. 9, the light-scattering layer 21 may be disposed in the region between the phase difference layer 22 and the phase difference layer 25, and the light-scattering layer 23 may be disposed in the region between the phase difference layer 25 and the polarizing layer 24.

Third Modification

Figure 10:
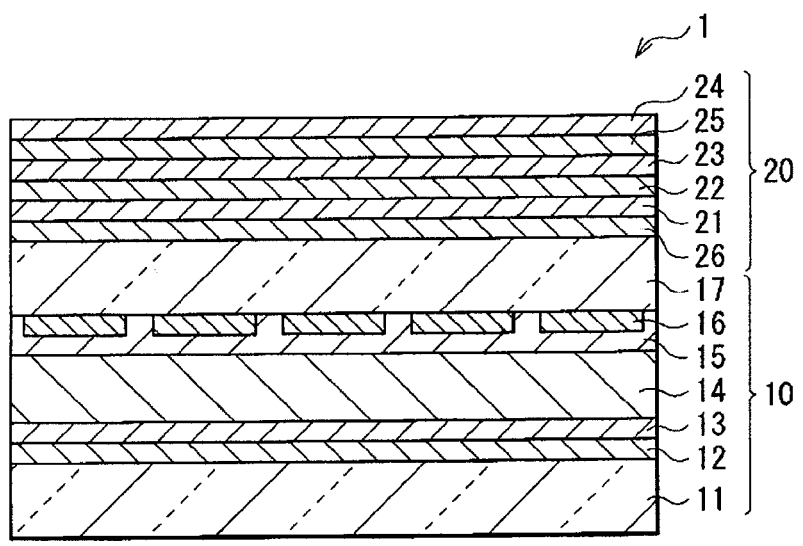
FIG. 10 is a sectional view showing another modification of the configuration of the liquid crystal device of FIG. 7.

While the two phase difference layers have been provided in the first modification and the second modification described above, a third phase difference layer may further be provided. In this case, the third phase difference layer may have a different function from that of the previously provided phase difference layers; for example, the third phase difference layer may compensate for view angle characteristics of the liquid crystal layer 14. For instance, as shown in FIG. 10, a phase difference layer 26 for compensating for the view angle characteristics of the liquid crystal layer 14 may be provided between the upper substrate 17 and the light-scattering layer 21. Incidentally, as an example of the phase difference layer for compensating for the view angle characteristics, there may be mentioned a C-Plate which has little phase difference in the plane thereof and in which the refractive index in the vertical direction (normal direction) is different from the refractive index in the plane thereof. Other examples of the phase difference layer for compensating for view angle characteristics include a liquid crystal polymer film in which hybrid alignment is fixed.

Fourth Embodiment

While the two light-scattering layers 21 and 23 have been disposed separate from each other in the embodiment and its modifications (the first to third modifications) described above, the two light-scattering layers may be in contact with each other. For example, as shown in FIG. 11, the two light-scattering layers 21 and 23 may be provided between the upper substrate 17 and the phase difference layer 22, and the light-scattering layer 21 and the light-scattering layer 23 may be in contact with each other. Where the two light-scattering layers 21 and 23 are disposed in contact with each other, the measured value of the contrast in the apparatus shown in FIG. 6 is slightly lower, as compared with the case where the two scattering layers 21 and 23 are disposed separate from each other. However, the contrast in the case where the two light-scattering layers 21 and 23 are disposed in contact with each other is slightly higher than the contrast in the case where only a single light-scattering layer is provided.

Fifth Modification

While one or a plurality of phase difference layers have been provided as the optical layer(s) other than the uppermost optical layer in the optical layer stack 20 in the embodiment and its modifications (the first to fourth modifications) described above, a layer or layers different from the phase difference layer(s) in function may also be provided.

Sixth Modification

The values of retardation and the orientations of optical axes exemplified in the above embodiments and its modification (the first modification) are merely given as typical examples. Therefore, the retardation value may be different from the above-mentioned values, and the orientations of optical axes may be different from the above-mentioned orientations, insofar as they are within such ranges that the desired operation and effect can be obtained.

3. Application Example

Now, an application example of the liquid crystal device 1 according to any of the embodiment and its modifications described above will be described below. FIG. 12 is a perspective view of an example of general configuration of an electronic apparatus 100 according to the present application example. The electronic apparatus 100 is a cell phone, which, for example, as shown in FIG. 12, includes a main body section 111, and a display body section 112 which can be opened and closed relative to the main body section 111. The main body section 111 has operation buttons 115 and a telephone transmitter section 116. The display body section 112 has a display device 113 and a telephone receiver section 117. The display device 113 is so designed that various display images relating to telephone communications are displayed on a display screen 114 of the display device 113. The electronic apparatus 100 has a control section (not shown) for controlling the operations of the display device 113. This control section is provided inside the main body section 111 or the display body section 112, as part of a control unit for controlling the whole part of the electronic apparatus 100 or separately from the control unit.

The display device 113 has the same configuration as that of the liquid crystal device 1 according to any of the embodiment and its modifications described above. This ensures that in the display device 113, the luminance in the frontward direction is high and a high contrast comparable to that achieved hitherto can be obtained.

Incidentally, examples of the electronic apparatus to which the liquid crystal device 1 according to any of the embodiment and its modifications described above can be applied include, in addition to the above-mentioned cell phone, personal computer, liquid crystal TV, view finder type or monitor direct viewing type video tape recorder, car navigation device, pager, electronic note, electronic calculator, word processor, work station, TV phone, POS terminal, etc.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The invention claimed is:

1. A liquid crystal device comprising:
a liquid crystal layer;
a first substrate and a second substrate between which the liquid crystal layer is sandwiched;
a reflective layer operable to reflect light which is incident thereon from the second substrate side through the liquid crystal layer;
a plurality of optical layers disposed on the side opposite to the first substrate with reference to the second substrate, wherein an uppermost one of the plurality of optical layers is a polarizing layer and one or more of the plurality of optical layers are phase difference layers;
one or more light-scattering layers which are each disposed in at least one of a region between the second substrate and the plurality of optical layers and a region between two mutually proximate ones of the plurality of optical layers and which each show relatively larger forward scattering and relatively smaller back scattering,
wherein the uppermost one of the plurality of optical layers converts natural light being externally incident thereon into linearly polarized light, one or more of the phase difference layers convert the linearly polarized light incident thereon from the polarizing layer side into circularly polarized light such that light back-scattered by the one or more light-scattering layers is converted into circularly polarized light that is in a direction opposite to light forward-scattered by the one or more light-scattering layers and received at a reflective electrode, at least some regions of the liquid crystal layer convert circularly polarized light into linearly polarized light, and at least other regions of the liquid crystal layer pass circularly polarized light such that the reflective electrode receives linearly polarized light and circularly polarized light.

2. The liquid crystal device according to claim 1, wherein the one or more light-scattering layers each have a filler-containing tacky layer or a filler-containing resin layer.

3. The liquid crystal device according to claim 2, wherein the one or more light-scattering layers has a filler-containing tacky layer.

4. The liquid crystal device according to claim 1, wherein the one or more light-scattering layers are disposed separate from each other.

5. The liquid crystal device according to claim 4, wherein the plurality of optical layers other than the uppermost one of the plurality of optical layers each have a phase difference layer.

6. The liquid crystal device according to claim 5, wherein the one or more light-scattering layers are formed in a region between two mutually proximate optical layers, and at least one of the plurality of optical layers has a phase difference layer which is disposed between the second substrate and the light-scattering layer, disposed closest to the second substrate, of the one or more light-scattering layers and which compensates for view angle characteristics of the liquid crystal layer.

7. The liquid crystal device according to claim 5, wherein the reflective layer has a plurality of reflective electrodes, and the liquid crystal device further comprises a plurality of counter electrodes opposed to the reflective layer, with the liquid crystal layer therebetween.

8. The liquid crystal device according to claim 1, wherein regions of the liquid crystal layer convert circularly polarized light into linearly polarized light when no voltage is applied to the regions of the liquid crystal layer and regions of the liquid crystal layer pass circularly polarized light when voltage is applied to the regions of the liquid crystal layer.

9. An electronic apparatus comprising a liquid crystal device as a display unit, wherein the liquid crystal device includes:
a liquid crystal layer;
a first substrate and a second substrate between which the liquid crystal layer is sandwiched;
a reflective layer operable to reflect light which is incident thereon from the second substrate side through the liquid crystal layer;
a plurality of optical layers disposed on the side opposite to the first substrate with reference to the second substrate, wherein an uppermost one of the plurality of optical layers is a polarizing layer and one or more of the plurality of optical layers are phase difference layers; and one or more light-scattering layers which are each disposed in either one of a region between the second substrate and the plurality of optical layers and a region between two mutually proximate ones of the plurality of optical layers and which each show relatively larger forward scattering and relatively smaller back scattering, wherein the uppermost one of the plurality of optical layers converts natural light being externally incident thereon into linearly polarized light, one or more of the phase difference layers convert the linearly polarized light incident thereon from the polarizing layer side into circularly polarized light such that light back-scattered by the one or more light-scattering layers is converted into circularly polarized light that is in a direction opposite to light forward-scattered by the one or more light-scattering layers and received at a reflective electrode, at least some regions of the liquid crystal layer convert circularly polarized light into linearly polarized light, and at least other regions of the liquid crystal layer pass circularly polarized light such that the reflective electrode receives linearly polarized light and circularly polarized light.

10. The electronic apparatus according to claim 9, wherein the one or more light-scattering layers each have a filler-containing tacky layer or a filler-containing resin layer.

11. The electronic apparatus according to claim 10, wherein the one or more light-scattering layers has a filler-containing tacky layer.

12. The electronic apparatus according to claim 9, wherein the one or more light-scattering layers are disposed separate from each other.

13. The electronic apparatus according to claim 12, wherein the plurality of optical layers other than the uppermost one of the plurality of optical layers each have a phase difference layer.

14. The electronic apparatus according to claim 13, wherein the one or more light-scattering layers are formed in a region between two mutually proximate optical layers, and at least one of the plurality of optical layers has a phase difference layer which is disposed between the second substrate and the light-scattering layer, disposed closest to the second substrate, of the one or more light-scattering layers and which compensates for view angle characteristics of the liquid crystal layer.

15. The electronic apparatus according to claim 13, wherein the reflective layer has a plurality of reflective electrodes, and the liquid crystal device further comprises a plurality of counter electrodes opposed to the reflective layer, with the liquid crystal layer therebetween.

16. The electronic apparatus according to claim 9, wherein regions of the liquid crystal layer convert circularly polarized light into linearly polarized light when no voltage is applied to the regions of the liquid crystal layer and regions of the liquid crystal layer pass circularly polarized light when voltage is applied to the regions of the liquid crystal layer.

* * * * *